UNITED STATES PATENT OFFICE.

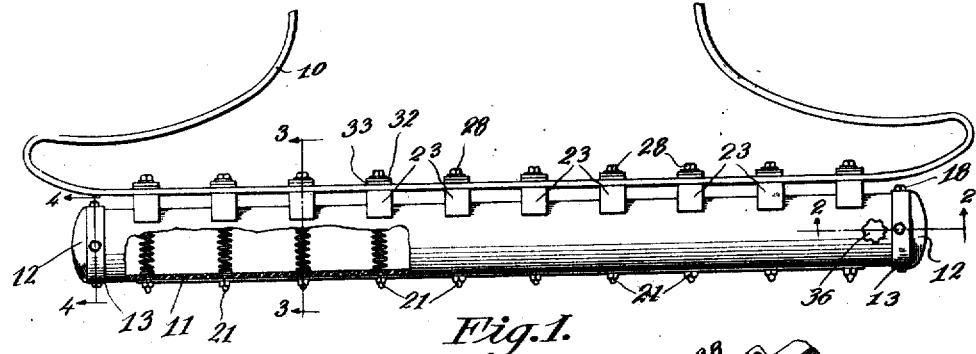
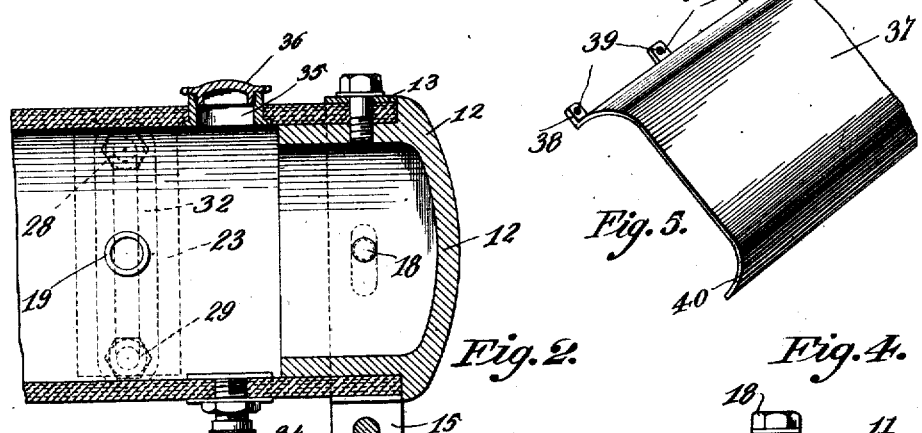
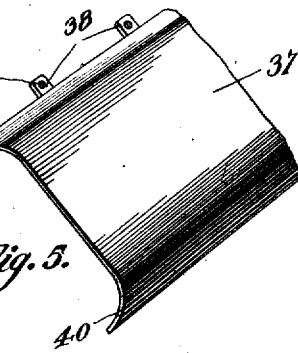
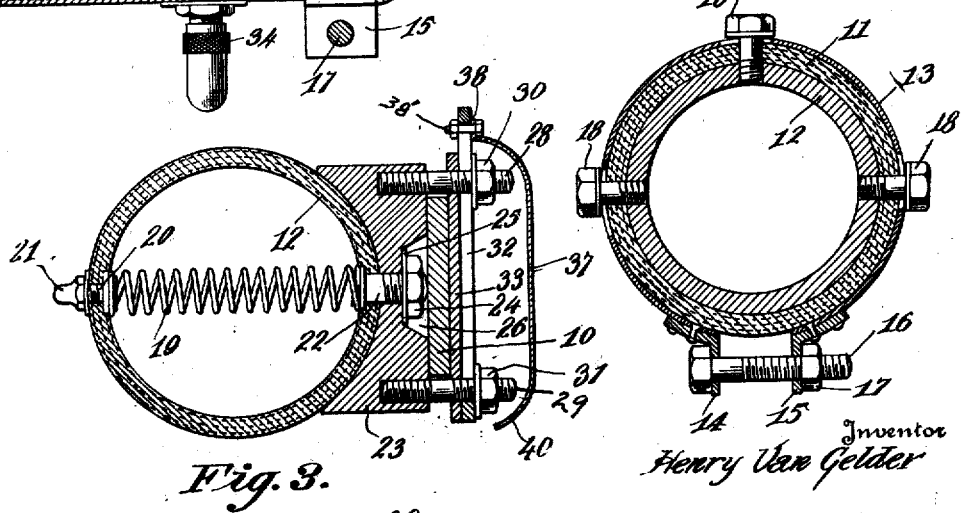

HENRY VAN GELDER, OF JERSEY CITY, NEW JERSEY.

BUFFER FOR VEHICLE BUMPERS.

1,402,324.   Specification of Letters Patent.   Patented Jan. 3, 1922.

Application filed October 13, 1921. Serial No. 507,462.

*To all whom it may concern:*

Be it known that I, HENRY VAN GELDER, a citizen of the United States, residing at Jersey City, in the county of Hudson and State of New Jersey, have invented new and useful Improvements in Buffers for Vehicle Bumpers, of which the following is a specification.

This invention relates to buffers for vehicle bumpers, and has for its object the providing of a casing which can be readily attached to a vehicle, with yielding means for absorbing the excessive shock received by the bumper when the vehicle strikes an object.

A further object of the invention resides in providing a vehicle bumper with a pneumatic spring casing which will not only tend to lessen the injury received by the buffer, but also the person or object struck.

One of the salient defects found in the yielding type of buffer, now in common use, and which applicant's device is intended to overcome, is the fact that when the buffer is brought into contact with a solid or heavy object, it is often indented and deformed as a result thereof, to such an extent that it cannot again be made to assume its original formation. This not only tends to greatly diminish the efficiency and durability of the buffer, but also in a considerable degree detracts from the general appearance of the vehicle to which it is attached.

By means of the present invention the excessive shock received by the bumper is absorbed by the buffer and the injury which would ordinarily be received by the bumper is thereby prevented.

With the above and other objects in view, this invention consists of the construction and arrangement of parts as are more fully described in the claims.

Referring to the drawings:

Fig. 1 is a top plan view of a buffer attached to a vehicle bumper.

Fig. 2 is a longitudinal section taken on the line 2—2 of Fig. 1.

Fig. 3 is a vertical section taken on the line 3—3 of Fig. 1, showing a cover attachment for the rearwardly extending bolts.

Fig. 4 is a vertical section taken on the line 4—4 of Fig. 1.

Fig. 5 is a fragmentary view of the cover for the buffer.

Fig. 6 is a detail view of the slotted washer plate.

Referring to the drawings wherein like numerals represent like parts in the various figures, 10 indicates an ordinary type of buffer which may be attached either to the forward or rearward end of a vehicle.

The present invention consists in a buffer comprising a pneumatic casing 11 which is preferably made of rubberized fabric, but may be of any other specific material or combination of materials. The ends of the casing are closed by means of the metal caps 12 secured to the casing by the straps 13, provided at their ends with the angular lugs 14 and 15 having openings therein to receive the threaded bolts 16 to which are attached the threaded nuts 17. The radially extending bolts 18 prevent rotation of the straps 18 with respect to the casing 11.

Diametrically disposed within the casing 11 are arranged a plurality of distended spiral springs 19 attached at their forward ends to the bolts 20 which extend through the casing 11 and are secured thereto by the nuts 21 in such a manner as to form an air tight compartment in the interior of the casing. The inner ends of the springs 19 are similarly attached to bolts 22 which extend through and are secured to the brackets 23 by the nuts 24 and washers 25, located in the recess portions 26 formed in the inner walls of the brackets 23.

The metal brackets 23 have their outer walls 27 concave so as to conform with the surface of the casing 11. To the inner walls of each of the brackets 23 are rigidly secured a pair of threaded bolts 28 and 29 which receive the correspondingly threaded nuts 30 and 31.

The buffer is secured to the bumper 10 by means of the metal plates 32 and leather washers 33, which are arranged to be secured to each of the bracket members 23, by means of the rearwardly extending bolts 28 and 29 and the nuts 30 and 31. The bumper 10 is attached to the buffer by being interposed between the inner wall of the brackets 23 and plates 32 and washers 33, as shown in Fig. 3.

Air is admitted into the casing by the air valve 34, which is arranged adjacent one of the cap members 12. If, for any reason, the inflatable casing should become deflated, and it should be impossible to refill the same with air, an opening 35, to which is threadedly secured a closing cap 36, is arranged in the wall of the casing diametrically opposite and above the air valve 34 for the admission of water into the interior of the casing, thus providing auxiliary means for maintaining pressure in the casing capable of withstanding any shock that the buffer might receive.

When the buffer is attached to the forward bumper of an automobile that has to be cranked by hand, a cover or shield 37 is provided to be attached to the plates 32, so as to form a shield for the rearwardly extending bolts 28 and 29, and thus prevent any injury either to the person or the clothes of the one who is required to crank the machine.

The cover 37 is formed at one end with upwardly extending lugs 38, which are provided with openings 39, which register with the longitudinal slots 32′ in the plates 32 and are adapted to be secured thereto by means of the nuts 38′ as best shown in Fig. 3.

The cover 37 has its lower end 40 extending downwardly and inwardly under the bolts 29 so as to prevent these bolts from being exposed.

While the buffer is shown for use on an automobile, it can be easily converted for use on trucks and heavy motor vehicles by increasing the thickness of the casing 11 and the size of the springs 19.

By reason of the springs 19 being diametrically disposed within the interior of the casing and distended against the walls thereof, additional yielding means is provided for assisting the air or liquid in the casing to absorb any excessive shock it might receive by being brought into contact with an object.

It is to be understood that the form of invention herein shown and described is to be taken as a preferred construction and arrangement of parts may be made as will remain within the spirit of the invention and scope of what is claimed.

I claim:

1. A buffer for vehicle bumpers, comprising a tubular casing, a plurality of diametrically disposed springs in said casing, a plurality of brackets secured to said casing, and means on said brackets for attaching the buffer to a vehicle.

2. A buffer for vehicle bumpers comprising an inflatable casing, springs in said casing, brackets secured to said springs, and means on said brackets for attaching the buffer to a vehicle.

3. A buffer for vehicle bumpers, comprising a tubular casing having diametrically disposed springs therein, and means attached to said springs for securing the buffer to a vehicle bumper.

4. A buffer for vehicle bumpers comprising a pneumatic casing having diametrically disposed springs therein, brackets having their outer walls concaved to conform to the surface of said casing, and means attached to said springs for securing the casing to said brackets.

5. A buffer for vehicle bumpers, comprising a tubular pneumatic casing having diametrically disposed springs arranged therein, brackets, means on said brackets attached to the ends of said springs for securing the casing to the brackets, and means in said brackets for attaching the buffer to a vehicle.

6. A buffer for vehicle bumpers comprising an inflatable casing having diametrically disposed springs arranged therein, brackets having inwardly threaded bolts secured thereto, and means attached to said springs for securing the casing to the vehicle.

7. A buffer for vehicle bumpers, comprising a tubular casing provided with yielding means arranged within said casing, and means attached to said yielding means for securing the casing to a vehicle.

8. A buffer for vehicle bumpers, comprising a casing, yielding means in said casing normally distended against the walls of said casing, brackets having threaded bolts extending rearwardly therefrom attached to said casing, and means on said bolts for securing the buffer to a vehicle.

9. In combination with a vehicle bumper, a buffer comprising a pneumatic casing having an air inlet valve and means for allowing the admission of a liquid into the casing when the latter has become deflated.

10. In combination with a vehicle bumper, a buffer comprising a pneumatic casing having diametrically disposed springs arranged therein, an air inlet valve at one end of the casing, and independent means in said casing for the admission of a liquid when the casing has become deflated.

11. A buffer for vehicle bumpers comprising a tubular casing, having diametrically disposed springs arranged therein, brackets secured to said casing, rearwardly extending bolts in said brackets, longitudinal slotted plates detachably secured to said bolts, and a shield extending over said bolts secured to said plates.

12. A buffer for vehicle bumpers comprising a tubular casing, having diametrically disposed springs arranged therein, brackets secured to said casing, rearwardly extending bolts in said brackets, longitudinal slotted plates detachably secured to said bolts, and a detachable shield extending over said bolts secured to said plates.

13. A buffer for vehicle bumpers comprising a casing, diametrically disposed springs in said casing, means extending through the walls of said casing for normally maintaining the springs distended, brackets attached to said casing, rearwardly extending bolts on said brackets, slotted plates detachably secured to said bolts, a shield attached to said plates and means attached to said bracket for securing the buffer to a vehicle.

14. A buffer for vehicle bumpers comprising a tubular casing having diametrically disposed springs therein, bolts extending through the walls of said casing and attached to the springs for keeping the latter normally distended, brackets secured to said casing, and means on said brackets for attaching the buffer to a vehicle bumper.

15. A buffer for vehicle bumpers comprising a pneumatic casing, having diametrically disposed springs arranged therein.

In testimony whereof I have hereunto set my hand.

HENRY VAN GELDER.

Witness:
　Wm. H. Wittpenn.